US010924295B2

(12) United States Patent
Gu et al.

(10) Patent No.: US 10,924,295 B2
(45) Date of Patent: Feb. 16, 2021

(54) METHOD AND APPARATUS FOR OCCUPYING UNLICENSED BAND CHANNEL

(71) Applicant: Alcatel Lucent, Boulogne Billancourt (FR)

(72) Inventors: Junrong Gu, Shanghai (CN); Feng Han, Shanghai (CN); Jianguo Liu, Shanghai (CN); Yan Meng, Shanghai (CN); Jun Wang, Shanghai (CN); Zhuo Wu, Shanghai (CN); Gang Shen, Shanghai (CN); Tao Tao, Shanghai (CN)

(73) Assignee: ALCATEL LUCENT, Nozay (FR)

( * ) Notice: Subject to any disclaimer, the term of this patent is extended or adjusted under 35 U.S.C. 154(b) by 8 days.

(21) Appl. No.: 15/566,413

(22) PCT Filed: Apr. 1, 2016

(86) PCT No.: PCT/IB2016/000591
§ 371 (c)(1),
(2) Date: Oct. 13, 2017

(87) PCT Pub. No.: WO2016/166603
PCT Pub. Date: Oct. 20, 2016

(65) Prior Publication Data
US 2018/0092050 A1  Mar. 29, 2018

(30) Foreign Application Priority Data

Apr. 15, 2015 (CN) .......................... 201510177014.5

(51) Int. Cl.
*H04L 12/28* (2006.01)
*H04W 52/36* (2009.01)
(Continued)

(52) U.S. Cl.
CPC ............. *H04L 12/28* (2013.01); *H04W 28/04* (2013.01); *H04W 52/36* (2013.01); *H04W 52/243* (2013.01); *H04W 52/28* (2013.01)

(58) Field of Classification Search
None
See application file for complete search history.

(56) References Cited

U.S. PATENT DOCUMENTS

2011/0319125 A1  12/2011 Nakano
2012/0082082 A1* 4/2012 Etemad .................... H04L 5/14
370/312
(Continued)

FOREIGN PATENT DOCUMENTS

WO  WO 2013/085150 A1  6/2013

OTHER PUBLICATIONS

Huawei et al., "RRM/CSI measurement and feedback for unlicensed carrier," 3$^{rd}$ Generation Partnership Project (3GPP), 3GPP TSG RAN WG1 Meeting #80, R1-150047, 5 pages, XP050933264, Athens, Greece, Feb. 9-13, 2015.
(Continued)

*Primary Examiner* — Andrew C Oh
(74) *Attorney, Agent, or Firm* — Fay Sharpe LLP

(57) ABSTRACT

The present invention relates to a method and an apparatus for occupying an unlicensed band channel, thereby avoiding misjudgment of an occupied unlicensed band state. A method for occupying an unlicensed band channel includes: a user equipment receiving a power increase rate of a reference signal transmission unit of an unlicensed band channel determined by a secondary cell (Scell) base station; the user equipment receiving, in the unlicensed band channel, a sub-frame of reference signal transmission unit level power distribution sent by the Scell base station; the user equipment decoding the power increase rate; and the user
(Continued)

equipment using the power increase rate to process the sub-frame.

14 Claims, 4 Drawing Sheets

(51) Int. Cl.
*H04W 28/04* (2009.01)
*H04W 52/28* (2009.01)
*H04W 52/24* (2009.01)

(56) References Cited

U.S. PATENT DOCUMENTS

| | | | |
|---|---|---|---|
| 2012/0224545 A1* | 9/2012 | Ohta | H04W 72/0473 |
| | | | 370/329 |
| 2014/0086166 A1* | 3/2014 | Lindbom | H04L 5/005 |
| | | | 370/329 |
| 2014/0226551 A1* | 8/2014 | Ouchi | H04W 52/40 |
| | | | 370/311 |
| 2014/0369293 A1* | 12/2014 | Guo | H04L 5/0073 |
| | | | 370/329 |
| 2015/0312958 A1* | 10/2015 | Cheng | H04B 7/0413 |
| | | | 370/252 |
| 2015/0341131 A1* | 11/2015 | Sano | H04L 25/0224 |
| | | | 370/329 |
| 2016/0080063 A1* | 3/2016 | Sahara | H04B 7/0626 |
| | | | 370/329 |
| 2016/0128046 A1* | 5/2016 | Sebire | H04L 5/001 |
| | | | 370/329 |
| 2016/0192335 A1* | 6/2016 | Kusashima | H04L 5/0053 |
| | | | 370/280 |
| 2016/0205669 A1* | 7/2016 | Kusashima | H04L 5/0092 |
| | | | 370/280 |
| 2016/0227519 A1* | 8/2016 | Nimbalker | H04L 5/0057 |
| 2016/0227548 A1* | 8/2016 | Nimbalker | H04L 5/0051 |
| 2016/0255665 A1* | 9/2016 | Futaki | H04W 72/1247 |
| | | | 370/329 |
| 2016/0286449 A1* | 9/2016 | Choi | H04W 36/18 |
| 2017/0289852 A1* | 10/2017 | Yang | H04L 5/0055 |
| 2017/0332264 A1* | 11/2017 | Mo | H04W 72/085 |

OTHER PUBLICATIONS

International Search Report for PCT/IB2016/000591 dated Jul. 6, 2016.

\* cited by examiner

METHOD AND APPARATUS FOR OCCUPYING UNLICENSED BAND CHANNEL

BACKGROUND OF THE INVENTION

Field of the Invention

The present invention relates to wireless communication technologies, and in particular, to a method and an apparatus for occupying an unlicensed band channel in the wireless communication technologies.

Description of the Prior Art

The licensed assisted access (LAA) technology intends to coexist with various radio access technologies (RATs), and they may belong to various operators using the same or different models. Therefore, after an idle channel is declared, occupying and keeping a channel in an unlicensed band is a huge challenge for the LAA. For example, when a zero-power channel state information reference signal (ZP-CSI-RS) is transmitted, symbol level power in a sub-frame may change dramatically (or greatly).

For example, when four ZP-CSI-RSs are configured in a sub-frame, compared with a symbol being not provided with the ZP-CSI-RS, energy of the symbol provided with the ZP-CSI-RS is decreased by ⅙ by an average. For another example, in a non-full buffer case, some resource elements (REs) are not utilized, which may also cause energy decrease of the symbol on the whole bandwidth. When the energy of the symbol is excessively low, an adjacent base station or user equipment may detect a busy channel where the symbol locates as an idle or unused channel by mistake, and transmit data over the channel; therefore, severe channel interference may be caused. Moreover, a channel detection time window of Wireless Fidelity (WIFI) is much shorter than a symbol time of the long term evolution (LTE), so that the above problem becomes severer.

Therefore, an effective solution is in urgent need in the field to solve the above technical problem.

SUMMARY OF THE INVENTION

One object of the present invention is to provide a method and an apparatus for occupying an unlicensed band channel, thereby avoiding misjudgment of an occupied unlicensed band state.

A method for occupying an unlicensed band channel according to an embodiment of the present invention includes: a user equipment receiving a power increase rate of a reference signal transmission unit of an unlicensed band channel determined by a secondary cell (Scell) base station; the user equipment receiving, in the unlicensed band channel, a sub-frame of reference signal transmission unit level power distribution sent by the Scell base station; the user equipment decoding the power increase rate; and the user equipment using the power increase rate to process the sub-frame.

In an embodiment of the present invention, the user equipment receives the power increase rate from the Scell base station over the unlicensed band channel, and the power increase rate is sent to the user equipment in a semi-static manner. The Scell base station sends the power increase rate to a primary cell (Pcell) base station of the Scell base station, and the user equipment receives the power increase rate from the Pcell base station. The user equipment buffers the sub-frame after receiving it, and waits for a power adjustment instruction. The power increase rate is at least one of a ZP-CSI-RS power increase rate $\rho_C$ and a non-full buffer power increase rate $\rho_D$. The ZP-CSI-RS power increase rate $\rho_C$ is determined by $\rho_C = N/(N-N_{ZRS})$, where N is the total number of REs in the reference signal transmission unit, and $N_{ZRS}$ is the number of REs scheduled for a ZP-CSI-RS in the reference signal transmission unit. The non-full buffer power increase rate $\rho_D$ is determined by $$\rho_D = \frac{E_{lower} - E_{con}}{N - N_{non}},$$

where $E_{tower}$ is an energy lower bound crossing the bandwidth of the reference signal transmission unit, $E_{con}$ is energy distributed by the reference signal transmission unit in conventional power distribution, N non is the number of unutilized REs in the reference signal transmission unit and the number of REs scheduled for the ZP-CSI-RS in the reference signal transmission unit, and N is the total number of REs in the reference signal transmission unit.

An embodiment of the present invention further provides a method for occupying an unlicensed band channel, and the method includes: a Scell base station determining a power increase rate of a reference signal transmission unit of an unlicensed band channel; the Scell base station directly or indirectly informing a user equipment of the power increase rate; the Scell base station sending a sub-frame of reference signal transmission unit level power distribution to the user equipment over the unlicensed band channel; and the secondary cell base station receiving, from the user equipment, a confirmation that the power increase rate has been received.

Another embodiment of the present invention provides a user equipment, which includes: a power increase rate receiver, a sub-frame receiver, a decoder, and a processor. The power increase rate receiver is configured to receive a power increase rate of a reference signal transmission unit of an unlicensed band channel determined by a Scell base station; the sub-frame receiver is configured to receive, in the unlicensed band channel, a sub-frame of reference signal transmission unit level power distribution sent by the Scell base station; the decoder is configured to decode the power increase rate; and the processor is configured to use the power increase rate to process the sub-frame.

Still another embodiment of the present invention provides a base station, including: a decision device, a power increase rate sender, a sub-frame sender, and a receiver. The decision device is configured to determine a power increase rate of a reference signal transmission unit of an unlicensed band channel; the power increase rate sender is configured to directly or indirectly inform a user equipment of the power increase rate;

the sub-frame sender is configured to send a sub-frame of reference signal transmission unit level power distribution to the user equipment over the unlicensed band channel; and the receiver, configured to receive, from the user equipment, a confirmation that the power increase rate has been received.

The embodiments of the present invention adopt a design of symbol level power distribution, and use the power increase rate so that 1) a symbol having a ZP-CSI-RS keeps total energy of the whole symbol unchanged relative to a symbol not having a ZP-CSI-RS; and/or 2) in a case of non-full buffer and/or some user equipments being unutilized, RE power of a Physical Downlink Shared Channel (PDSCH) is increased till the occupied unlicensed channel is kept. Therefore, the embodiments of the present invention can effectively prevent severe interference caused by misdetection of occupied unlicensed band channels.

DETAILED DESCRIPTION

To better understand the spirit of the present invention, the present invention is further described through a part of preferred embodiments of the present invention.

An embodiment of the present invention provides a method for occupying an unlicensed band channel, where at a user equipment side: a user equipment receives a power increase rate of a reference signal transmission unit of an unlicensed band channel determined by an Scell base station, the user equipment receives, in the unlicensed band channel, a sub-frame of reference signal transmission unit level power distribution sent by the Scell base station, and the user equipment decodes the power increase rate; and the user equipment uses the power increase rate to process the sub-frame. Correspondingly, at the Scell base station side, the Scell base station determines a power increase rate of a reference signal transmission unit of an unlicensed band channel, the Scell base station directly or indirectly informs a user equipment of the power increase rate, the Scell base station sends a sub-frame of reference signal transmission unit level power distribution to the user equipment over the unlicensed band channel, and the Scell base station receives, from the user equipment, a confirmation that the power increase rate has been received.

There are mainly two reasons causing power decrease of a busy unlicensed band channel: one is that a ZP-CSI-RS is transmitted; and the other one is a non-full buffer, there is no data in the buffer so that a part of physical resource blocks are empty or unutilized. Explanations are made in the following respectively directed to the two different cases.

Figure 1:
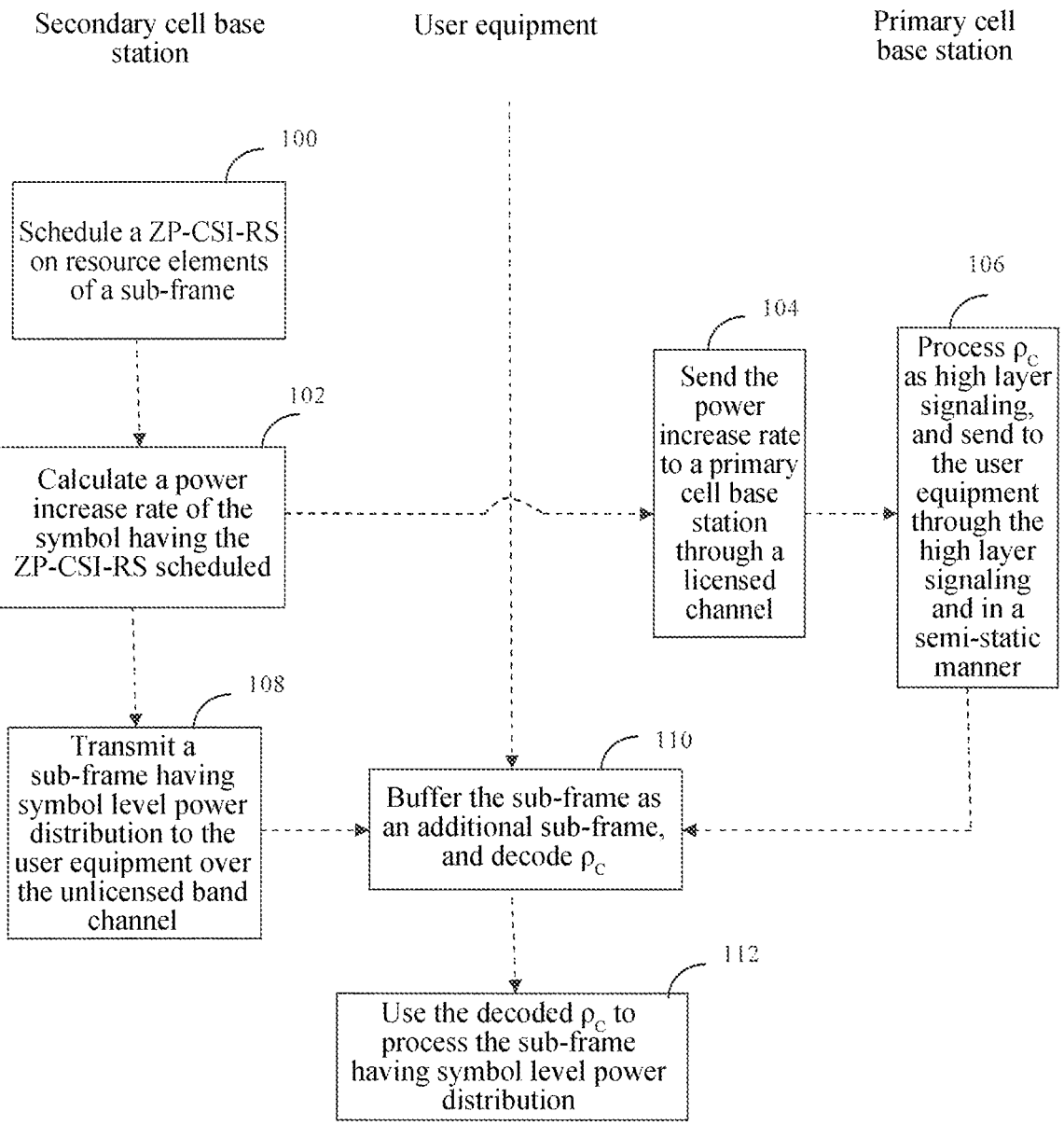
FIG. 1 is a schematic flow chart of a method for occupying an unlicensed band channel according to an embodiment of the present invention, which is applicable to a ZP-CSI-RS case.

FIG. 1 is a schematic flow chart of a method for occupying an unlicensed band channel according to an embodiment of the present invention, which may be applicable to the ZP-CSI-RS case.

As shown in FIG. 1, at a Scell base station side, in step 100, the Scell base station schedules a ZP-CSI-RS on REs of some symbols of a sub-frame. The symbol is a transmission unit of the ZP-CSI-RS, and the RE is a component unit of a physical resource block. In step 102, the Scell base station calculates a ZP-CSI-RS power increase rate $\rho_C$ of the symbols having the ZP-CSI-RS scheduled, and the ZP-CSI-RS power increase rate $\rho_C$ is determined by $\rho_C = N/(N - N_{ZRS})$, where N is the total number of REs in the reference signal transmission unit, and $N_{ZRS}$ is the number of REs scheduled for a ZP-CSI-RS in the reference signal transmission unit. To ensure that the ZP-CSI-RS power increase rate $\rho_C$ reaches the user equipment accurately and in time, in step 104, the Scell base station sends the power increase rate to a Pcell base station of the Scell base station through a licensed channel, instead of sending directly to the user equipment through the unlicensed band channel. In step 106, the Pcell base station processes the received ZP-CSI-RS power increase rate $\rho_C$ as high layer signaling, and sends the power increase rate to the user equipment through the high layer signaling and in a semi-static manner, thereby further improving the transmission quality of the ZP-CSI-RS power increase rate $\rho_C$. In another embodiment, for example, in a case that positions of the Scell base station and the Pcell base station do not overlap, the Scell base station may directly send the ZP-CSI-RS power increase rate to the user equipment over the unlicensed band channel. Even the Pcell base station is used for forwarding over the licensed channel, the high layer signaling may not be used, and the transmission period is not limited to be semi-static. In step 108, the Scell base station transmits a sub-frame having symbol level power distribution to the user equipment over the unlicensed band channel. In step 110, the user equipment buffers the sub-frame after receiving it, and waits for a power adjustment instruction, thereby having enough time to process and decode the ZP-CSI-RS power increase rate $\rho_C$. In another embodiment, the user equipment may directly decode the received ZP-CSI-RS power increase rate $\rho_C$. In step 112, the user equipment uses the decoded $\rho_C$ to process the sub-frame having symbol level power distribution.

Figure 2:
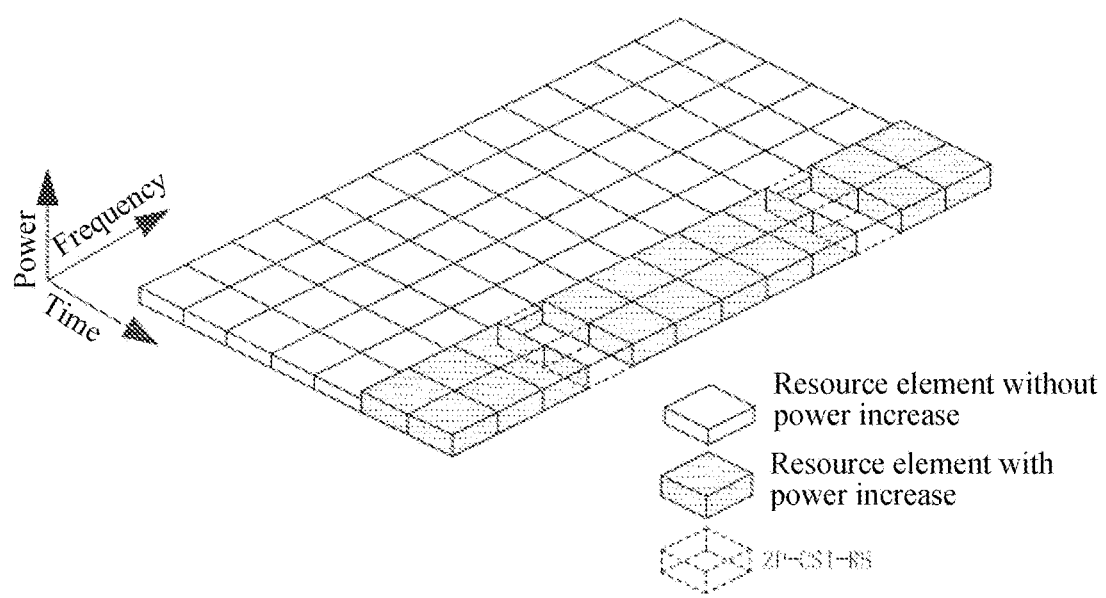
FIG. 2 is a schematic diagram of a sub-frame of symbol level power distribution obtained according to the embodiment shown in FIG. 1.

FIG. 2 is a schematic diagram of a sub-frame of symbol level power distribution obtained according to the embodiment shown in FIG. 1. It can be seen from FIG. 2 that, the power of REs of the sub-frame having symbol level power distribution being processed by using $\rho_C$ is increased, thereby preventing from being processed by an adjacent channel or the user equipment as an idle channel due to the low power.

Similarly, in the case of non-full buffer, similar symbol level power distribution may be implemented.

It may be defined that a buffer idle level of the S cell base station is $\varepsilon_{buffer}$, and an energy lower bound of a symbol crossing the bandwidth is $E_{lower}$. According to $\varepsilon_{buffer}$, a scheduler determines how many REs of the symbol crossing the bandwidth are utilized. When a conventional power distribution manner is applied, if the energy of the symbol is lower than $E_{lower}$, a power increase mode may be triggered. The Scell base station may calculate a power increase rate of a utilized PDSCH RE, that is, a non-full buffer power increase rate $\rho_D$. The non-full buffer power increase rate is determined by $$\rho_D = \frac{E_{lower} - E_{con}}{N - N_{non}},$$

where $E_{lower}$ is an energy lower bound crossing the bandwidth of the reference signal transmission unit, $E_{con}$ is energy distributed by the reference signal transmission unit in conventional power distribution, $N_{non}$ is the number of unutilized REs in the reference signal transmission unit and the number of REs scheduled for the ZP-CSI-RS in the reference signal transmission unit, and N is the total number of REs in the reference signal transmission unit. When the symbol has the ZP-CSI-RS, $N_{non}$ may further include the number of REs scheduled for the ZP-CSI-RS in the reference signal transmission unit. The transmission and processing details of $\rho_D$ are the same as those of $\rho_C$, and are not repeated herein.

Figure 3:
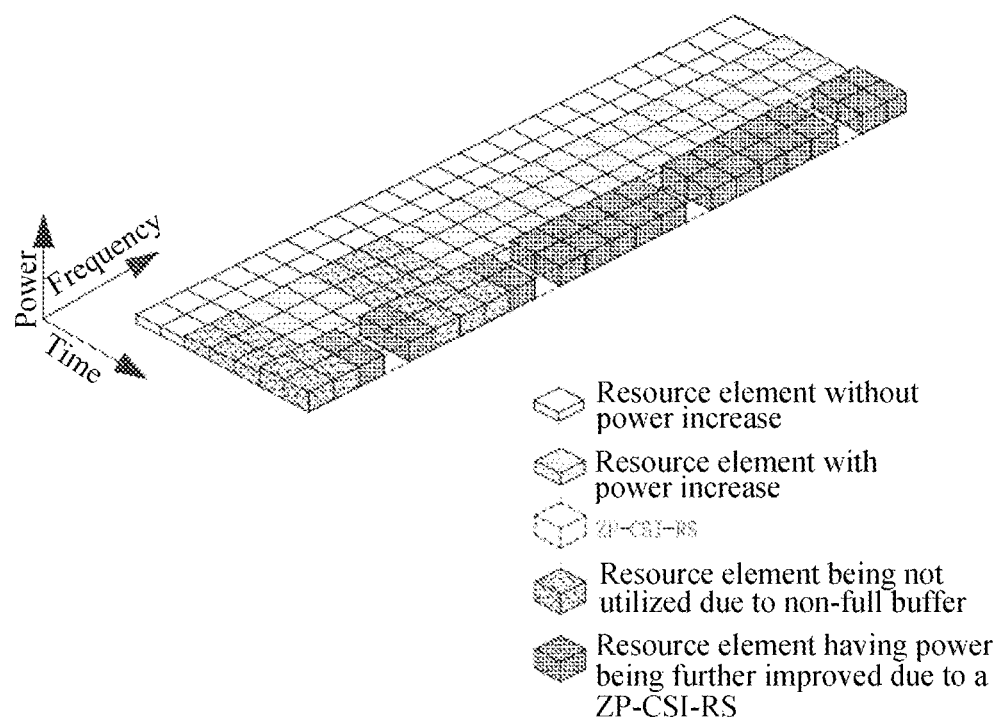
FIG. 3 is a schematic diagram of a sub-frame of symbol level power distribution obtained according to an embodiment of the present invention.

FIG. 3 is a schematic diagram of a sub-frame of symbol level power distribution obtained according to an embodiment of the present invention, which includes two cases of ZP-CSI-RS and non-full buffer. It can be seen from FIG. 3 that, the powers of the sub-frame having symbol level power distribution and REs thereof being processed by using $\rho_D$ and $\rho_C$ are increased, thereby preventing from being processed by an adjacent channel or the user equipment as an idle channel due to the low power.

Embodiments of the present invention further provide a user equipment and a base station, especially an Scell, that can implement the method for occupying an unlicensed channel.

Figure 4:
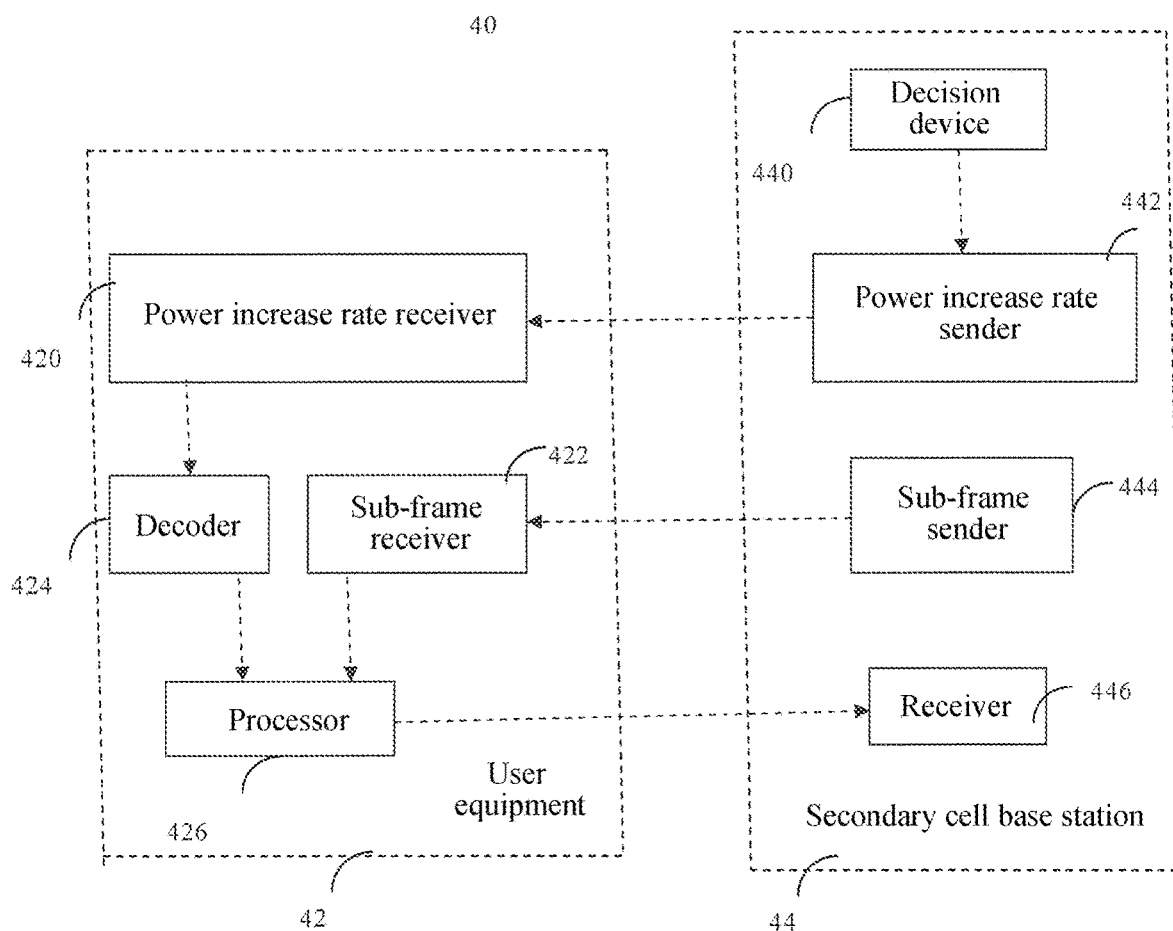
FIG. 4 is a schematic structural diagram of a wireless communication system according to an embodiment of the present invention, which includes a user equipment and a secondary cell base station thereof.

FIG. 4 is a schematic structural diagram of a wireless communication system 40 according to an embodiment of the present invention, which includes a user equipment 42 and an Scell base station 44 thereof.

As shown in FIG. 4, the user equipment 42 includes: a power increase rate receiver 420, a sub-frame receiver 422, a decoder 424, and a processor 426. The power increase rate receiver 420 is configured to receive a power increase rate of a reference signal transmission unit of an unlicensed band channel determined by the Scell base station 44; the sub-frame receiver 422 is configured to receive, in the unlicensed band channel, a sub-frame of reference signal transmission unit level power distribution sent by the Scell base station 44; the decoder 424 is configured to decode the power increase rate; and the processor 426 is configured to use the power increase rate to process the sub-frame. The Scell base station 44 includes: a decision device 440, a power increase rate sender 442, a sub-frame sender 444, and a receiver 446. The decision device 440 is configured to determine a power increase rate of a reference signal transmission unit of an unlicensed band channel; the power increase rate sender 442 is configured to directly or indirectly inform the user equipment 42 of the power increase rate; the sub-frame sender 444 is configured to send a sub-frame of reference signal transmission unit level power distribution to the user equipment 42 over the unlicensed band channel; and the receiver 446 is configured to receive, from the user equipment 42, a confirmation that the power increase rate has been received.

The technical content and technical features of the present invention have been disclosed in the above; however, persons skilled in the art can still make various replacements and modifications without departing from the spirit of the present invention based on the teaching and disclosure of the present invention. Therefore, the protection scope of the present invention should not be limited to the content disclosed in the embodiments, but should include various replacements and modifications without departing from the present invention, and be covered by the claims of the present invention.

We claim:

1. A method, for occupying an unlicensed band channel; the method comprising:
    receiving at a user equipment a power increase rate of a reference signal transmission unit of an unlicensed band channel determined by a secondary cell (Scell) base station;
    receiving at the user equipment, in the unlicensed band channel, a sub-frame of reference signal transmission unit level power distribution sent by the Scell base station;
    decoding at the user equipment the power increase rate; and
    using by the user equipment the power increase rate to process the sub-frame.

2. The method according to claim 1, wherein the user equipment receives the power increase rate from the Scell base station over the unlicensed band channel.

3. The method according to claim 1, wherein the Scell base station sends the power increase rate to a primary cell (Pcell) base station of the Scell base station, and the user equipment receives the power increase rate from the Pcell base station.

4. The method according to claim 1, wherein the user equipment buffers the sub-frame after receiving it, and waits for a power adjustment instruction.

5. The method according to claim 1, wherein the power increase rate is at least one of a zero-power channel state information reference signal (ZP-CSI-RS) power increase rate pc and a non-full buffer power increase rate pp.

6. The method according to claim 5, wherein the ZP-CSI-RS power increase rate $\rho_C$ is determined by $\rho_C=N/(N-N_{ZRS})$, wherein N is the total number of resource units (Res) in the reference signal transmission unit, and $N_{ZRS}$ is the number of REs scheduled for a ZP-CSI-RS in the reference signal transmission unit.

7. The method according to claim 5, wherein the non-full buffer power increase rate is determined by $$\rho_D = \frac{E_{lower} - E_{con}}{N - N_{non}},$$

wherein $E_{lower}$ is an energy lower bound crossing the bandwidth of the reference signal transmission unit, $E_{con}$ is energy distributed by the reference signal transmission unit in conventional power distribution, $N_{non}$ is the number of unutilized REs in the reference signal transmission unit and the number of REs scheduled for the ZP-CSI-RS in the reference signal transmission unit, and N is the total number of REs in the reference signal transmission unit.

8. A method, for occupying an unlicensed band channel; the method comprising:
    determining at a secondary cell (Scell) base station a power increase rate of a reference signal transmission unit of an unlicensed band channel;
    directly or indirectly informing a user equipment of the power increase rate by the Scell base station;
    sending a sub-frame of reference signal transmission unit level power distribution from the Scell base station to the user equipment over the unlicensed band channel; and
    receiving at the Scell base station, from the user equipment, a confirmation that the power increase rate has been received.

9. The method according to claim 8, wherein the Scell base station sends the power increase rate to a primary cell (Pcell) base station of the Scell base station, and the Pcell base station sends the power increase rate to the user equipment.

10. The method according to claim 8, wherein the power increase rate is at least one of a zero-power channel state information reference signal (ZP-CSI-RS) power increase rate $\rho_C$ and a non-full buffer power increase rate $\rho_D$.

11. The method according to claim 10, wherein the ZP-CSI-RS power increase rate $\rho_C$ is determined by $\rho_C=N/$ (N−N$_{ZRS}$), wherein N is the total number of resource units (Res) in the reference signal transmission unit, and N$_{ZRS}$ is the number of REs scheduled for a ZP-CSI-RS in the reference signal transmission unit.

12. The method according to claim 10, wherein the non-full buffer power increase rate is determined by $$\rho_D = \frac{E_{lower} - E_{con}}{N - N_{non}},$$

wherein E$_{lower}$ is an energy lower bound crossing the bandwidth of the reference signal transmission unit, E$_{con}$ is energy distributed by the reference signal transmission unit in conventional power distribution, N$_{non}$ is the number of unutilized REs in the reference signal transmission unit and the number of REs scheduled for the ZP-CSI-RS in the reference signal transmission unit, and N is the total number of REs in the reference signal transmission unit.

13. A user equipment, comprising:
a power increase rate receiver, configured to receive a power increase rate of a reference signal transmission unit of an unlicensed band channel determined by a secondary cell (Scell) base station;
a sub-frame receiver, configured to receive, in the unlicensed band channel, a sub-frame of reference signal transmission unit level power distribution sent by the Scell base station;
a decoder, configured to decode the power increase rate; and
a processor, configured to use the power increase rate to process the sub-frame.

14. A base station, comprising:
a decision device, configured to determine a power increase rate of a reference signal transmission unit of an unlicensed band channel;
a power increase rate sender, configured to directly or indirectly inform a user equipment of the power increase rate
a sub-frame sender, configured to send a sub-frame of reference signal transmission unit level power distribution to the user equipment over the unlicensed band channel; and
a receiver, configured to receive, from the user equipment, a confirmation that the power increase rate has been received.

* * * * *